J. MERZ.
SPARE TIRE HOLDER.
APPLICATION FILED OCT. 23, 1919.
1,417,678.
Patented May 30, 1922.
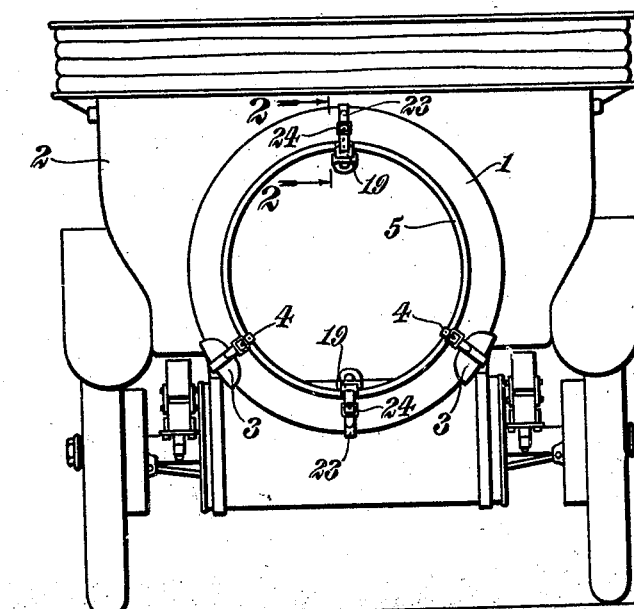
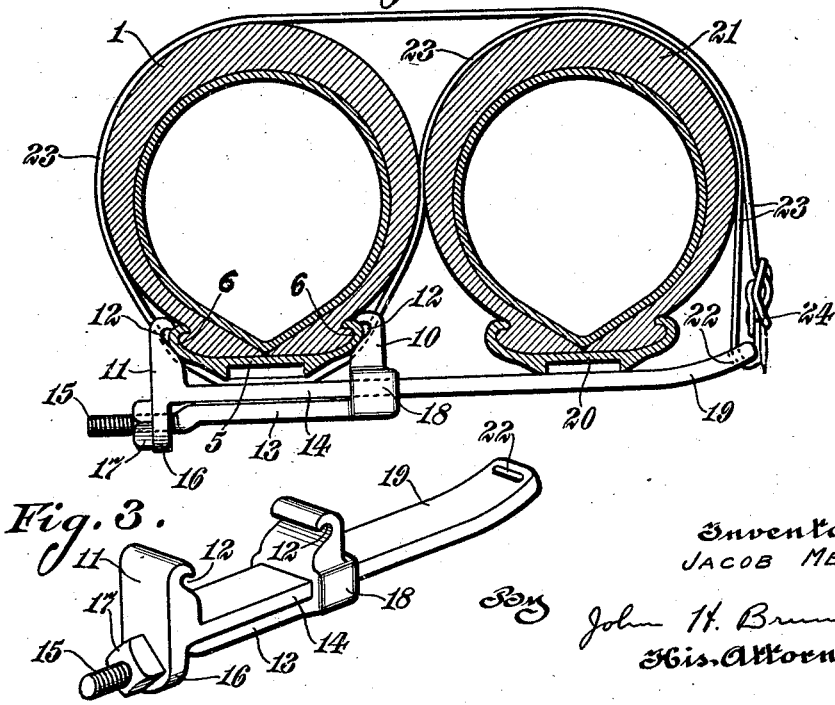
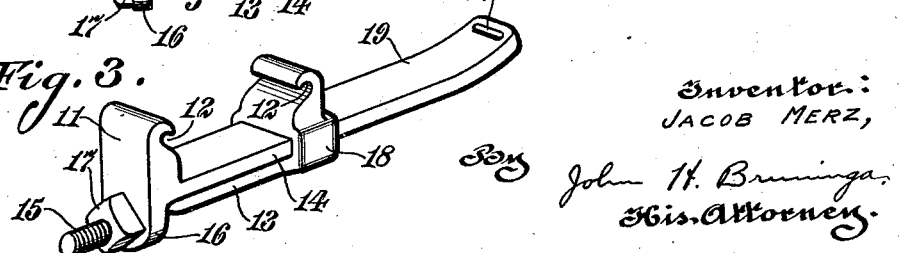
Inventor:
JACOB MERZ,
By John H. Bruninga,
His Attorney.

UNITED STATES PATENT OFFICE.

JACOB MERZ, OF CHICAGO, ILLINOIS.

SPARE-TIRE HOLDER.

1,417,678.  Specification of Letters Patent.  Patented May 30, 1922.

Application filed October 23, 1919. Serial No. 332,831.

*To all whom it may concern:*

Be it known that I, JACOB MERZ, a citizen of the United States, and residing at Chicago, Illinois, have invented a new and useful Improvement in Spare-Tire Holders, of which the following is a specification.

This invention relates to tire holders, and more particularly to tire holders of the type adapted to hold a spare tire by supporting it from the rim of another tire on the automobile.

One of the objects of this invention is to provide a spare tire holder whch can readily be applied to a rim, and when applied, will provide a convenient support for a spare tire.

Another object is to provide a spare tire holder, which is simple in construction, effective in its action, and economical to manufacture.

Further objects will appear from the detail description taken in connection with the accompanying drawing, in which:

Figure 1 is a rear view of an automobile showing the application of the spare tire holder embodying this invention;

Figure 2 is an enlarged section on the line 2—2, Figure 1; and

Figure 3 is a perspective view of the spare tire holder.

Referring to the accompanying drawing, 1 designates a tire mounted on the body 2 of an automobile, the mounting being through the medium of any suitable or usual forms of supports, such, for instance, as brackets 3 and straps 4. The tire 1 may have, as is usual, any suitable form of demountable rim 5 provided with beads or edges 6 for holding the casing of the tire in position.

The spare tire holder embodying this invention comprises a pair of jaws 10 and 11, each of which is recessed as shown at 12, to engage the edge or bead 6 of the tire rim 6 mounted on the automobile. The jaw 10 has a shank 13, while the jaw 11 has a shank 14, which extend parallel but in opposite directions, and slide one on the other. The shank 13 has a threaded end 15 passing through a perforated lug 16 on the jaw 11 and this threaded end 15 is engaged by a nut 17. The shank 14 passes through the perforated boss 18 joining the jaw 10 with the shank 13. Accordingly, the shanks are arranged for telescoping movement one with respect to the other, and by tightening the nut 17, the jaws 10 and 11 will firmly grip the rim 5 so as to position the device inside of the rim.

The shank 14 is extended for some distance and is directed outwardly, as shown at 19, in order to provide a support for the rim 20 of a spare tire 21. The end of this shank is slotted, as shown at 22, in order to receive a strap 23, the bight of which passes through the slot 22 so as to permit the strap to pass over the tire 21 around the rim 5 and tire 1 and to be secured by a buckle 24.

It is to be understood that there may be one or more of these tire holders attached to the rim of a tire on the automobile, or where a tire support in the form of a rim is employed, which engages internally with the rim on the first tire, the jaws of the spare tire holder may clamp this rim. These tire holders will, therefore, provide a very convenient and simple holder for supporting a spare tire in addition to the usual tire.

Furthermore, the holder may be applied to any form of rim or support, as it is susceptible of universal adjustment to various conditions. The outwardly directed end 19 serves to hold the spare tire in such a way so as to obviate unnecessary strain on the strap 23 and this strap may be even dispensed with.

It is obvious that various changes may be made in the details of construction without departing from the spirit of this invention; it is, therefore, to be understood that this invention is not to be limited to the specific details shown and described.

Having thus described the invention, what is claimed is:

1. A spare tire holder, comprising, a pair of jaws adapted to grip the edges of a rim, and shanks on said jaws adapted to slide on one another.

2. A spare tire holder, comprising, a pair of jaws adapted to grip the edges of a rim, and oppositely directed shanks on said jaws.

3. A spare tire holder, comprising, a pair of jaws adapted to grip the edges of a rim, and shanks on said jaws, one of said shanks forming a tire support.

4. A spare tire holder, comprising, a pair of jaws adapted to grip the edges of a rim, and shanks on said jaws, one of said shanks forming a tire support, while the other shank forms a clamping element.

5. A spare tire holder, comprising, a pair of jaws adapted to grip the edges of a rim, and shanks on said jaws, the shank on one jaw telescoping with the other jaw and forming a tire support.

6. A spare tire holder, comprising, a pair of jaws adapted to grip the edges of a rim, shanks on said jaws, the shank on one jaw telescoping with the other jaw, and a clamping element on said shank.

7. A spare tire holder, comprising, a pair of jaws adapted to grip the edges of a rim, a shank on one of said jaws adapted to provide a carrier, and a strap passing about the rim and engaging the carrier, adapted to hold and secure a tire.

In testimony whereof I affix my signature this 25th day of September, 1919.

JACOB MERZ.